US008195017B2

(12) United States Patent
Kaneshiro et al.

(10) Patent No.: US 8,195,017 B2
(45) Date of Patent: Jun. 5, 2012

(54) CONSUMER INPUT/OUTPUT (CIO) OPTICAL TRANSCEIVER MODULE FOR USE IN AN ACTIVE OPTICAL CABLE, AN ACTIVE OPTICAL CABLE THAT INCORPORATES THE CIO OPTICAL TRANSCEIVER MODULE, AND A METHOD

(75) Inventors: Ronald T. Kaneshiro, San Jose, CA (US); Xiaozhong Wang, Sunnyvale, CA (US); Kit Man Cham, Cupertino, CA (US); Paul Yu, Mountain View, CA (US); Chung-Yi Su, Fremont, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 203 days.

(21) Appl. No.: 12/790,904

(22) Filed: May 31, 2010

(65) Prior Publication Data
US 2011/0293221 A1    Dec. 1, 2011

(51) Int. Cl.
G02B 6/30    (2006.01)
G02B 6/36    (2006.01)
G02B 6/12    (2006.01)

(52) U.S. Cl. ............... 385/49; 385/14; 385/88; 385/147
(58) Field of Classification Search .................... 385/14, 385/15, 16, 49, 88, 147
See application file for complete search history.

(56) References Cited

U.S. PATENT DOCUMENTS

| 5,666,272 | A  | * | 9/1997  | Moore et al. ................. 361/735 |
| 6,149,465 | A  |   | 11/2000 | Berg et al. |
| 6,335,869 | B1 |   | 1/2002  | Branch et al. |
| 6,491,446 | B1 | * | 12/2002 | Kryzak ............................. 385/89 |
| 6,556,445 | B2 |   | 4/2003  | Medina |
| 6,570,768 | B2 |   | 5/2003  | Medina |
| 6,685,363 | B2 | * | 2/2004  | Kryzak ............................. 385/89 |
| 6,746,158 | B2 |   | 6/2004  | Merrick |
| 6,994,478 | B1 |   | 2/2006  | Chiu et al. |
| 7,008,248 | B2 | * | 3/2006  | Kondas et al. ................ 439/211 |
| 7,147,502 | B1 |   | 12/2006 | Wu |
| 7,204,712 | B2 |   | 4/2007  | Schwiebert et al. |

(Continued)

FOREIGN PATENT DOCUMENTS
CN         101499821 A     8/2009

OTHER PUBLICATIONS

QSFP (Quad Small Form-factor Pluggable) InterBOARD® Active Optical Cable, 2005 Reflex Photonics Inc.

(Continued)

*Primary Examiner* — Akm Ullah (57) ABSTRACT

A consumer input/output (CIO) optical transceiver module, an active optical cable that incorporates a CIO optical transceiver module, and a method for using a CIO optical transceiver module in an active optical cable are provided. In contrast to optical transceiver modules currently used in active optical cables, which utilize parallel arrays of laser diodes and parallel arrays of photodiodes, the CIO optical transceiver module includes two singlet laser diodes and two singlet photodiodes for providing two high-speed transmit channels and two high-speed receive channels, respectively. Because the singlet laser diodes and photodiodes of the CIO optical transceiver module are less costly than the parallel arrays of laser diodes and parallel arrays of photodiodes that are used in known active optical cables, the CIO optical transceiver module can be manufactured at relatively low costs with high quality, and therefore is well suited for consumer applications.

19 Claims, 11 Drawing Sheets

U.S. PATENT DOCUMENTS

| | | | |
|---|---|---|---|
| 7,215,554 B2 | 5/2007 | Torres et al. | |
| 7,238,040 B1 | 7/2007 | Wu | |
| 7,281,862 B2 * | 10/2007 | Oen et al. | 385/88 |
| 7,281,937 B2 | 10/2007 | Reed et al. | |
| 7,307,847 B2 | 12/2007 | Torres et al. | |
| 7,354,292 B1 | 4/2008 | Lloyd | |
| 7,402,070 B1 | 7/2008 | Wu | |
| 7,416,353 B2 | 8/2008 | Yoshikawa et al. | |
| 7,445,389 B2 * | 11/2008 | Aronson | 385/88 |
| 7,473,124 B1 | 1/2009 | Briant | |
| 7,513,698 B2 | 4/2009 | Andersson | |
| 7,566,226 B2 * | 7/2009 | Roemer et al. | 439/49 |
| 7,690,939 B2 | 4/2010 | Wu | |
| 7,736,171 B2 | 6/2010 | Reed et al. | |
| 7,771,225 B1 | 8/2010 | Wu | |
| 7,841,887 B2 | 11/2010 | Zhang et al. | |
| 8,030,570 B2 * | 10/2011 | Seraj et al. | 174/88 C |
| 2002/0142917 A1 | 10/2002 | Merrick | |
| 2002/0167793 A1 | 11/2002 | Branch et al. | |
| 2006/0252311 A1 | 11/2006 | Togami et al. | |
| 2006/0258201 A1 | 11/2006 | Schwiebert et al. | |
| 2009/0188106 A1 | 7/2009 | Wang | |
| 2009/0227133 A1 | 9/2009 | Zhang et al. | |
| 2009/0290619 A1 * | 11/2009 | Flens et al. | 375/219 |
| 2009/0291578 A1 | 11/2009 | Wu | |
| 2010/0246142 A1 | 9/2010 | Phillips | |
| 2011/0080008 A1 | 4/2011 | Teo | |
| 2011/0267742 A1 | 11/2011 | Togami et al. | |

OTHER PUBLICATIONS

ZL60620 ZLynx QSFP Active Optical Cable (4+4)×5 Gbps Data Sheet, Mar. 2009, 2 Pages, Zarlink Semiconductor Inc.

* cited by examiner

CONSUMER INPUT/OUTPUT (CIO) OPTICAL TRANSCEIVER MODULE FOR USE IN AN ACTIVE OPTICAL CABLE, AN ACTIVE OPTICAL CABLE THAT INCORPORATES THE CIO OPTICAL TRANSCEIVER MODULE, AND A METHOD

TECHNICAL FIELD OF THE INVENTION

The invention relates to active optical cables. More particularly, the invention relates to a consumer input/output (CIO) optical transceiver module for use in an active optical cable that is well suited for consumer applications.

BACKGROUND OF THE INVENTION

An active optical cable is an optical fiber cable that is terminated on one or both ends with a plug that contains an optical transceiver module. The plug has a housing that is typically configured to be received within an opening formed in a cage. Mechanical coupling features on the plug housing form a latch that interlocks with mechanical coupling features on the cage to secure the plug housing to the cage. When the plug housing is fully inserted into the cage, the latch of the plug housing engages one or more of the mechanical coupling features of the cage to lock the plug housing inside of the cage. The latch of the plug housing is typically operable by a user to be placed in a delatching position that decouples the plug housing from the cage to enable the user to remove the plug housing from the cage.

Figure 1:
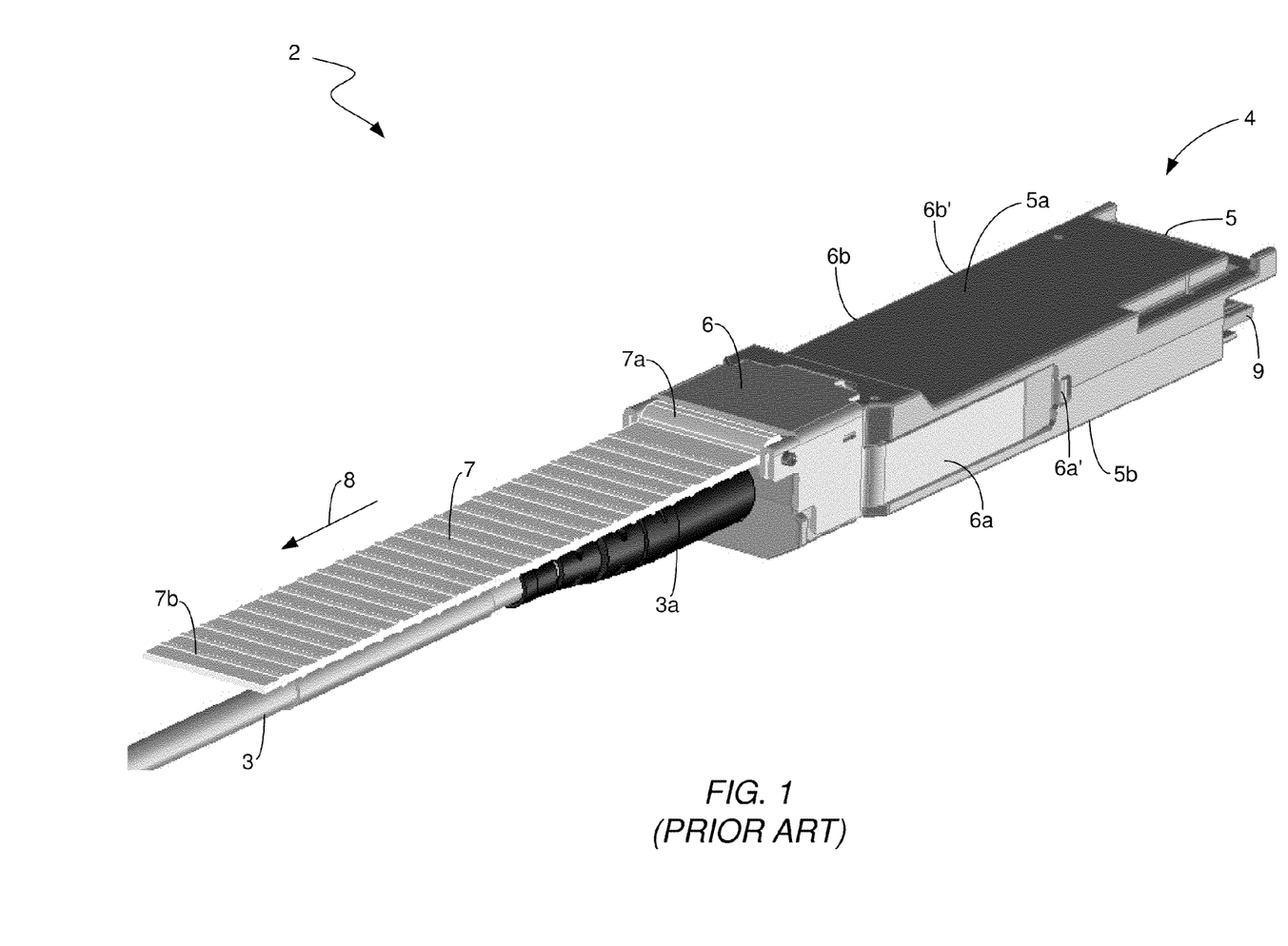
FIG. 1 illustrates a top perspective view of a known Quad Small Form-Factor Pluggable (QSFP) active optical cable currently used in the optical communications industry.

FIG. 1 illustrates a top perspective view of a known Quad Small Form-Factor Pluggable (QSFP) active optical cable 2 currently used in the optical communications industry. An optical fiber cable 3 of the QSFP active optical cable 2 includes a plurality of transmit optical fibers (not shown for purposes of clarity) and a plurality of receive optical fibers (not shown for purposes of clarity). The end 3a of the cable 3 is terminated with a plug 4. The plug 4 has a housing 5 in which the aforementioned optical transceiver module (not shown for purposes of clarity) is housed. The plug housing 5 includes a first housing portion 5a and a second housing portion 5b, which are connected together by fastening elements (not shown for purposes of clarity). The first and second portions 5a and 5b of the plug housing 5 are typically made of cast aluminum, cast zinc, or a cast zinc alloy.

A delatch device 6 of the plug 4 allows the plug housing 5 to be delatched from a cage (not shown for purposes of clarity) to enable the plug housing 5 to be removed from the cage. A pull tab 7 is connected on its proximal end 7a to the delatch device 6. When a user pulls on the distal end 7b of the pull tab 7 in the direction indicated by arrow 8, slider portions 6a and 6b of the delatch device 6 move to a limited extent in the direction indicated by arrow 8 (only slider portion 6a can be seen in FIG. 1). This movement of the slider portions 6a and 6b causes outwardly curved ends 6a' and 6b' of the slider portions 6a and 6b, respectively, to press against respective catch features on the cage (not shown for purposes of clarity) to allow the plug housing 5 to be retracted from the cage.

The majority of active optical cables currently used in the optical communications industry have configurations that are similar to that of the QSFP active optical cable 2 shown in FIG. 1, although other types of active optical cables of other form factors are also used in the industry. In QSFP active optical cables of the type shown in FIG. 1, the optical transceiver module housed in the plug housing 5 typically includes parallel arrays of vertical cavity surface emitting lasers (VCSELs), parallel arrays of photodiodes, and parallel laser driver and receiver integrated circuit (IC) chips. These parallel components are mounted on an upper surface of a plug printed circuit board (PCB) 9. The parallel components, particularly the VCSEL arrays, are relatively expensive due in large part to the fact that a high degree of uniformity is required among the VCSELs. In addition, the parallel components used in these modules are manufactured in relatively low volumes, and thus generally have higher costs associated with them.

A need exists for a CIO optical transceiver module for use in an active optical cable that can be manufactured at relatively low costs with high quality and that is particularly well suited for consumer applications.

SUMMARY OF THE INVENTION

The invention is directed to a consumer input/output (CIO) optical transceiver module for use in an active optical cable, a method for using a CIO optical transceiver module in an active optical cable, and an active cable that includes one or more of the CIO optical transceiver modules. The CIO optical transceiver module comprises a module circuit board, at least first and second singlet laser diodes, at least first and second singlet photodiodes, at least one integrated circuit (IC), an optics system module, a latch, and a jumper. The module circuit board has a substrate, a plurality of electrical contacts disposed on the substrate and a plurality of electrical conductors passing through the substrate. The first and second singlet laser diodes, the first and second singlet photodiodes, the IC, and the optics system module are mounted on the circuit board substrate. The latch is mechanically coupled to the optics system module. The jumper is mechanically coupled to the latch. The jumper holds proximal ends of at least first and second transmit optical fibers and first and second receive optical fibers. A first set of optical elements of the optics system module optically couples light between the proximal ends of the first and second transmit optical fibers and the first and second singlet laser diodes, respectively. A second set of optical elements of the optics system module optically couples light between the proximal ends of the first and second receive optical fibers and the first and second singlet photodiodes, respectively.

The active optical cable includes an optical fiber cable having at least first and second transmit optical fibers and at least first and second receive optical fibers, and a plug housing connected to an end of the optical fiber cable, with the CIO optical transceiver module mounted in the plug housing.

The method comprises the following: providing a CIO optical transceiver module; connecting proximal ends of at least first and second transmit optical fibers and first and second receive optical fibers to a jumper of the CIO optical transceiver module; with a first set of optical elements of the optics system module, optically coupling light between the proximal ends of the first and second transmit optical fibers and the first and second singlet laser diodes, respectively; and, with a second set of optical elements of the optics system module, optically coupling light between the proximal ends of the first and second receive optical fibers and the first and second singlet photodiodes, respectively. The CIO optical transceiver module comprises: a module circuit board having a substrate, a plurality of electrical contacts disposed on the substrate and a plurality of electrical conductors passing through the substrate; at least first and second singlet laser diodes mounted on the circuit board substrate; at least first and second singlet photodiodes mounted on the circuit board substrate; at least one IC mounted on the substrate; the optics system module, which is mounted on the substrate; a latch mechanically coupled to the optics system module; and the jumper, which is mechanically coupled to the latch.

These and other features and advantages of the invention will become apparent from the following description, drawings and claims.

DETAILED DESCRIPTION OF AN EXEMPLARY EMBODIMENT

The invention is directed to a CIO optical transceiver module for use in an active optical cable, an active optical cable that incorporates the CIO optical transceiver module, and a method for using the CIO optical transceiver module in an active optical cable. In contrast to the optical transceiver module of the active optical cable 2 shown in FIG. 1 that utilizes the aforementioned parallel components, the CIO optical transceiver module includes two singlet laser diodes and two singlet photodiodes for providing two transmit channels and two receive channels, respectively. Because the singlet laser diodes and photodiodes of the CIO optical transceiver module are utilized in many areas in the optical communications industry, they are manufactured in relatively large volumes, and thus are less costly than the parallel arrays of laser diodes and parallel arrays of photodiodes that are used in the active optical cable 2 shown in FIG. 1. For this and other reasons that are described below, the CIO optical transceiver module can be manufactured at relatively low costs, and therefore is well suited for consumer applications.

Figure 2:
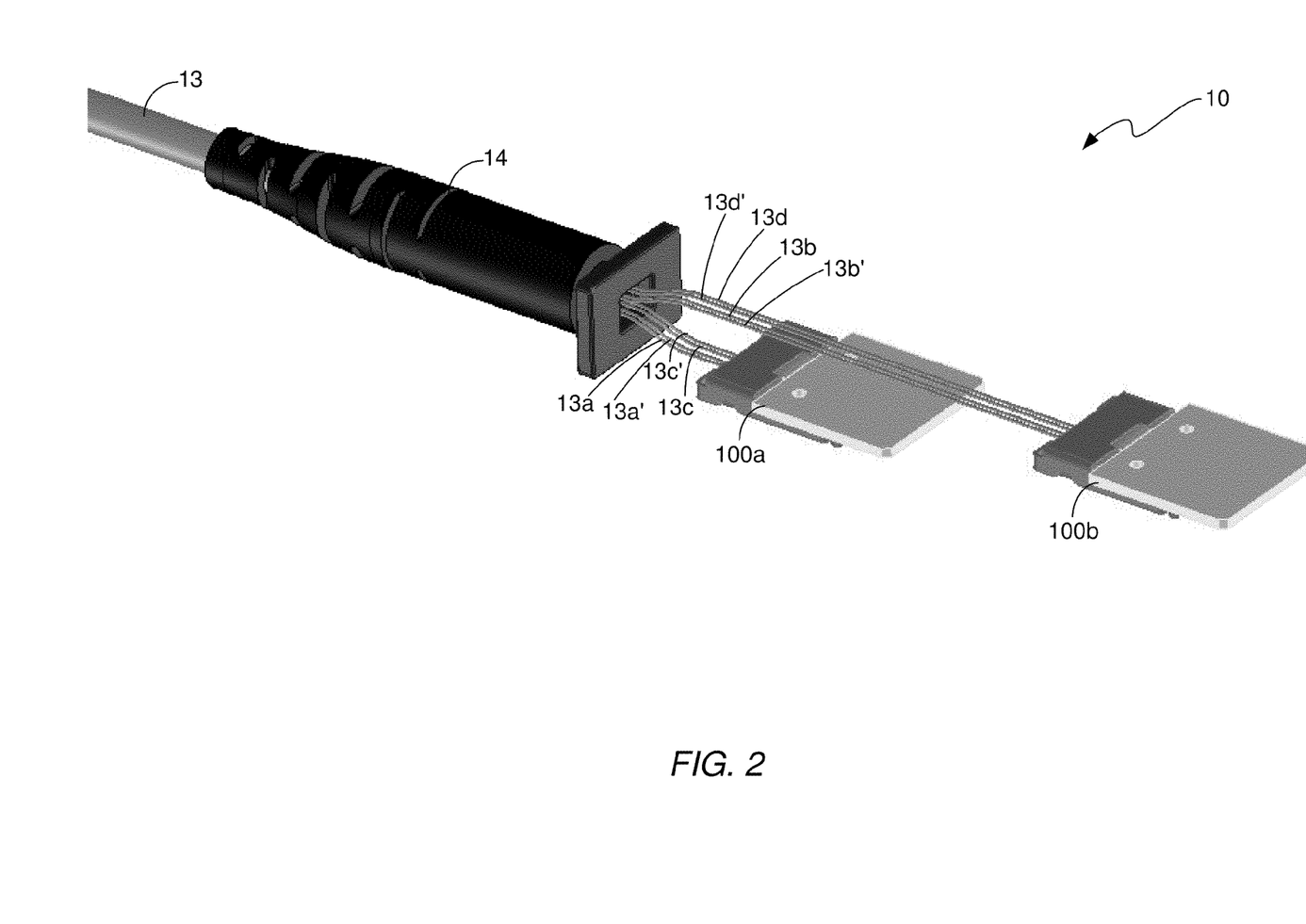
FIG. 2 illustrates a top perspective view of the active optical cable in accordance with an illustrative embodiment with the plug housing removed to show the CIO optical transceiver modules in accordance with an illustrative embodiment of the invention.

FIG. 2 illustrates a perspective view of an active optical cable 10 in accordance with an illustrative embodiment with the plug housing removed to reveal two CIO optical transceiver modules 100a and 100b of the active optical cable 10. The active optical cable 10 includes an optical fiber cable 13 having a boot 14 disposed on a proximal end thereof for connecting the optical fiber cable 13 to a plug (not shown for purposes of clarity) that houses the CIO optical transceiver modules 100a and 100b. The plug will be described below in detail with reference to FIGS. 3 and 4. In accordance with this illustrative embodiment, the optical fiber cable 13 includes four transmit optical fibers 13a, 13a', 13b, and 13b' and four receive optical fibers 13c, 13c', 13d, and 13d'. The proximal ends of two of the transmit optical fibers 13a and 13a' are terminated in the CIO optical transceiver module 100a. The proximal ends of the other two transmit optical fibers 13b and 13b' are terminated in the CIO optical transceiver module 100b. The proximal ends of two of the receive optical fibers 13c and 13c' are terminated in the CIO optical transceiver module 100a. The proximal ends of the other two receive optical fibers 13d and 13d' are terminated in the CIO optical transceiver module 100b. The operations and components of the CIO optical transceiver modules 100a and 100b are described below in detail with reference to FIGS. 4-9.

Figure 3:
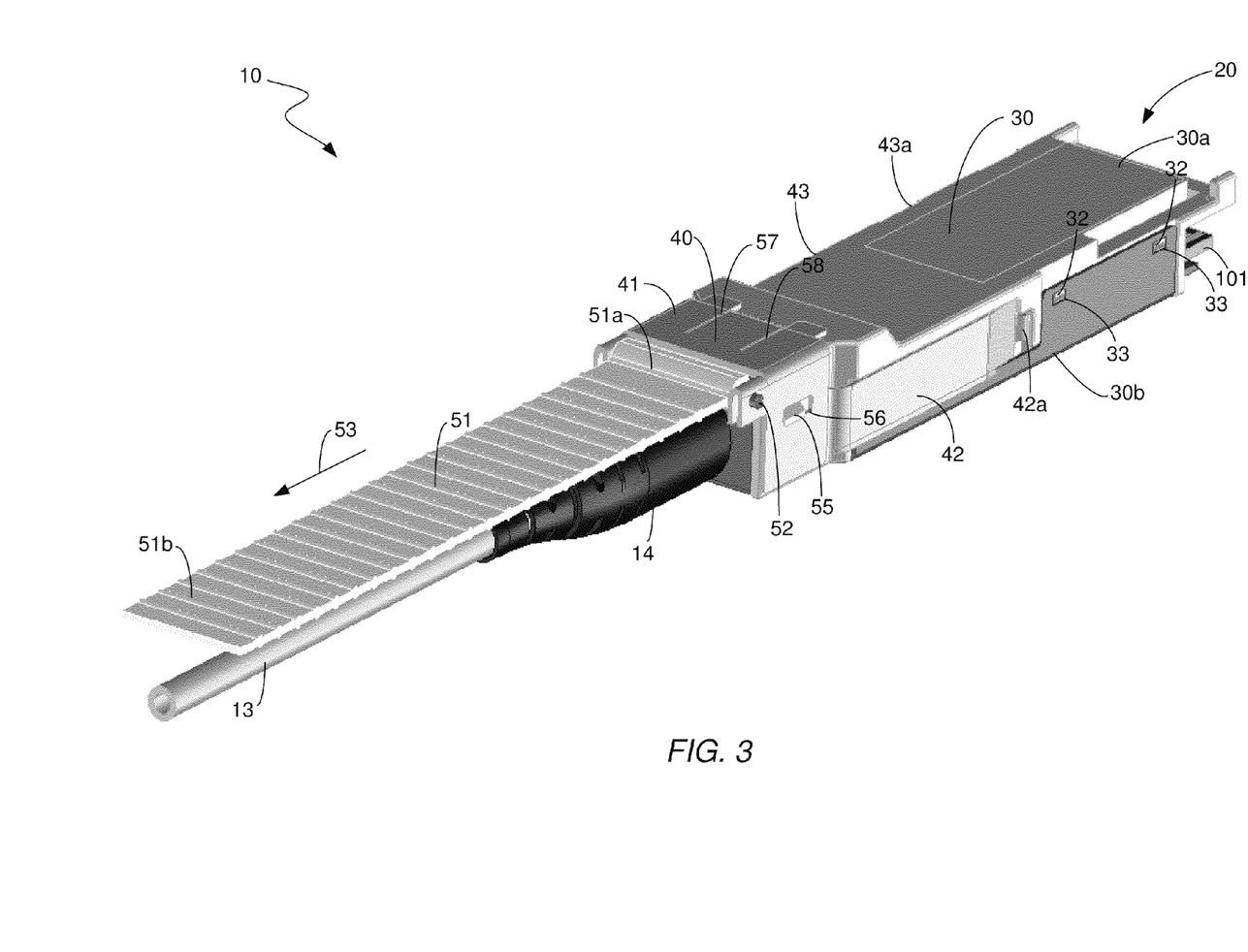
FIG. 3 illustrates a top perspective view of the active optical cable in accordance with an illustrative embodiment having a plug that houses the CIO optical transceiver modules shown in FIG. 2.

FIG. 3 illustrates a top perspective view of the active optical cable 10 in accordance with an illustrative embodiment, which shows one embodiment of the plug 20 that terminates the proximal end of the optical fiber cable 13. The plug 20 has a plug housing 30 that houses the CIO optical transceiver modules 100a and 100b shown in FIG. 2, as will be described below in detail with reference to FIGS. 5-9. In accordance with this embodiment, the plug housing 5 of the known active optical cable 2 shown in FIG. 1 has been modified to provide additional space within the housing to accommodate the CIO optical transceiver modules 100a and 100b. As indicated above with reference to FIG. 1, the first and second housing portions 5a and 5b of the plug housing 5 shown in FIG. 1 are typically made of a cast material, such as cast aluminum, cast zinc, or a cast zinc alloy. Because of the nature of the casting process that is used to create the first and second housing portions 5a and 5b, the wall thickness of the first and second housing portions 5a and 5b is typically greater than 0.5 millimeters (mm) in thickness. Consequently, there is insufficient space within the housing 5 of the known active optical cable 2 to accommodate the CIO optical transceiver modules 100a and 100b.

In accordance with the illustrative embodiment of FIG. 3, the plug housing 30 has a first housing portion 30a that is cast (e.g., cast aluminum, cast zinc, or a cast zinc alloy) and a second housing portion 30b that is made of sheet metal. Thus, the first housing portion 30a is very similar to the first housing portion 6a shown in FIG. 1, except that various modifications have been made to the first housing portion 30a to allow it to be mechanically coupled with the sheet metal second housing portion 30b. Because sheet metal can be made very thin, the use of sheet metal to make the second housing portion 30b decreases the wall thickness of the second housing portion 30b, thereby increasing the amount of space that is available within the plug housing 30 to accommodate the CIO optical transceiver modules 100a and 100b. In this manner, the plug 20 complies with one or more small form factor (SFF) standards, such as the SFF-8436 standard, for example.

Tabs 32 formed on the sides of the first housing portion 30a are configured to snap fit into respective openings 33 formed in the sides of the second housing portion 30b to secure the second housing portion 30b to the first housing portion 30a. A delatch device 40 of the plug 20 allows a user to delatch the plug 20 from a cage (not shown for purposes of clarity) to enable the plug 20 to be removed from the cage. The delatch device 40 includes a first delatch portion 41 and first and second slider portions 42 and 43 (only slider portion 42 can be seen in FIG. 3). The slider portions 42 and 43 may be identical to the slider portions 6a and 6b, respectively, of the delatch device 6 shown in FIG. 1. Likewise, the manner in which the slider portions 42 and 43 interact with features on a cage to disconnect the plug housing 30 from the cage may be identical to the manner described above with reference to FIG. 1 in which the slider portions 6a and 6b of the delatch device 6 interact with features on a cage to disconnect the plug housing 5 from the cage.

A pull tab 51 is connected on its proximal end 51a to the delatch device 40 by fastening devices 52. When a user pulls on the distal end 51b of the pull tab 51 in the direction indicated by arrow 53, the delatch device 40 moves to a limited extent in the direction indicated by arrow 53. This movement of the delatch device 40 causes the slider portions 42 and 43 of the delatch device 40 to move to a limited extent in the direction indicated by arrow 53. Tabs 55 located on opposite sides of the first housing portion 30a move within respective slots 56 located on opposite sides of the first delatch portion 41 to limit movement by the delatch device 40 relative to the first housing portion 30a. This movement of the slider portions 42 and 43 causes outwardly curved ends 42a and 43a of the slider portions 42 and 43, respectively, to press against respective catch features on the cage (not shown for purposes of clarity) to allow the plug 20 to be retracted from the cage.

It should be noted that the invention is not limited to the configuration of the plug housing 30 shown in FIG. 3. The configuration of the plug housing 30 shown in FIG. 3 is merely one example of a suitable plug housing configuration for housing the CIO optical transceiver modules 100a and 100b. As will be understood by persons skilled in the art, in view of the disclosure being provided herein, a number of suitable plug housing configurations exist or can me manufactured for this purpose.

Figure 4:
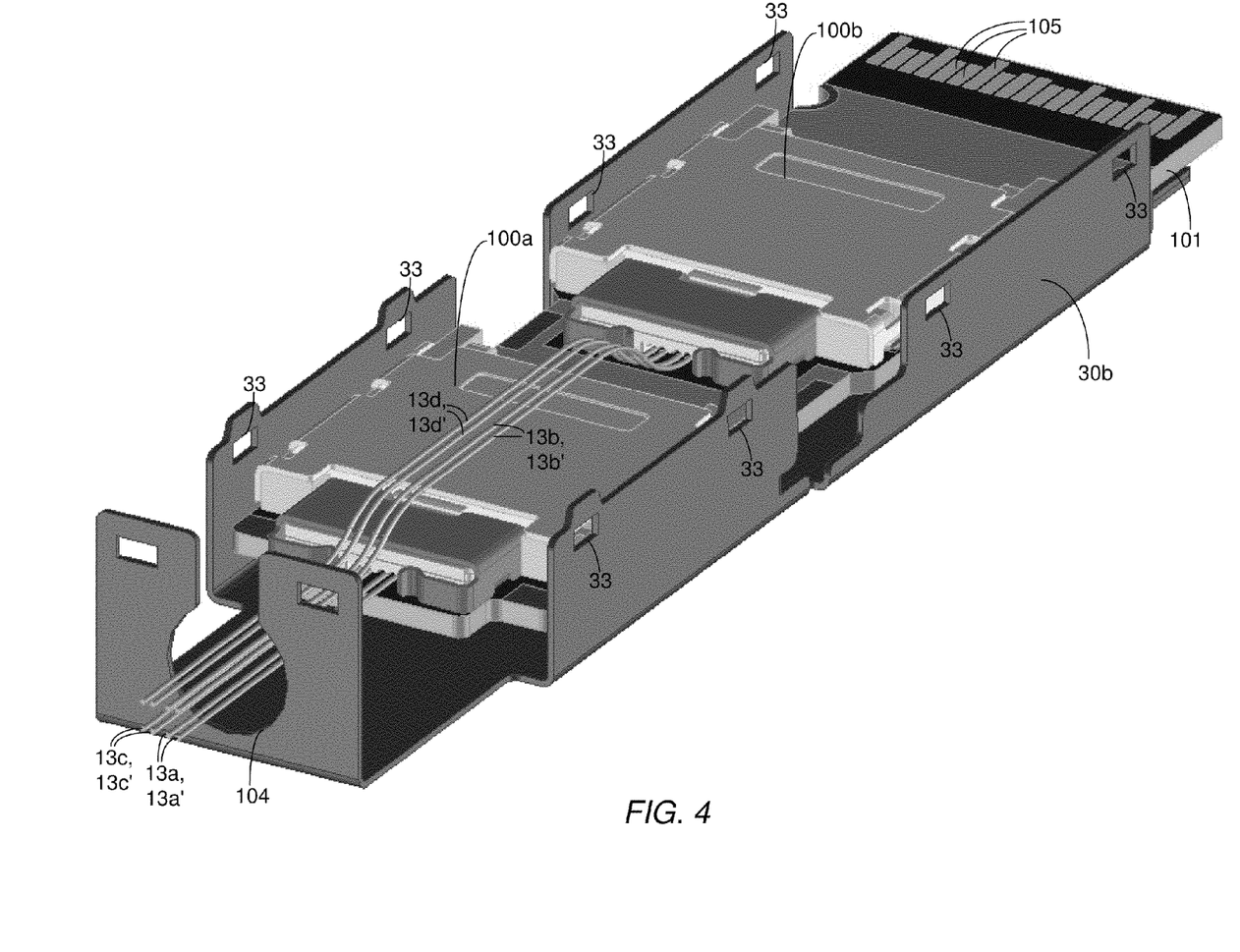
FIG. 4 illustrates a top perspective view of the second housing portion shown in FIG. 3 having the CIO optical transceiver modules shown in FIG. 2 mounted therein on an upper surface of a plug PCB.

FIG. 4 illustrates a top perspective view of the second housing portion 30b shown in FIG. 3 having the first and second CIO optical transceiver modules 100a and 100b mounted therein on a first surface of a plug PCB 101. The plug PCB 101 may be identical to the plug PCB 9 shown in FIG. 1 except that the configuration of the electrical traces running through plug PCB 101 will typically be different from the configuration of the electrical traces running through the plug PCB 9 due to the differences between the types of components that are mounted on the plug PCBs 9 and 101. The plug PCB 101 has electrical contacts 105 thereon for electrically coupling the plug PCB 101 to electrical circuitry of external equipment into which the plug 20 is plugged (not shown for purposes of clarity).

A portion of the boot 14 of the optical fiber cable 13 is received in the opening 104 provided in the second housing portion 30b. Two transmit optical fibers 13a and 13a' and two receive optical fibers 13c and 13c' pass out of the proximal end of the optical fiber cable 13 through the boot 14 and are connected to the first CIO optical transceiver module 100a. Likewise, two transmit optical fibers 13b and 13b' and two receive optical fibers 13d and 13d' pass out of the proximal end of the optical fiber cable 13 through the boot 14 and are connected to the second CIO optical transceiver module 100b.

The first and second CIO optical transceiver modules 100a and 100b have identical mechanical, optical and electrical configurations. Although the CIO optical transceiver modules 100a and 100b are not limited to operating at any particular data rates, in accordance with this illustrative embodiment, each CIO optical transceiver module 100a and 100b has two transmit channels, each of which operates at a data rate of at least 2.5 Gigabits per second (Gbps) and two receive channels, each of which operates at a data rate of at least 2.5 Gbps. Thus, each of the CIO optical transceiver modules 100a and 100b has an aggregate data rate of 10 Gbps, i.e., 5 Gbps in and 5 Gbps out, simultaneously. It should be noted that although two CIO optical transceiver modules 100a and 100b are shown in FIG. 4, more than two CIO optical transceiver module may be incorporated into the plug 20 of the active optical cable 10.

With reference again to FIGS. 3 and 4, the first housing portion 30a and the second housing portion 30b overlap over a relatively large interface above, below, and along locations around where the tabs 32 formed on the first housing portion 30a are received in the respective openings 33 formed on the second housing portion 30b. This relatively large area of overlap provides a Faraday cage that provides electromagnetic interference (EMI) shielding for components within the plug housing 30. Additionally, the invention eliminates the need to use traditional solutions such as silver epoxy along the seams, which allows the plug 20 to be more easily reworked if necessary, which, in turn, allows manufacturing costs to be reduced and manufacturing yield to be increased.

Figure 5:
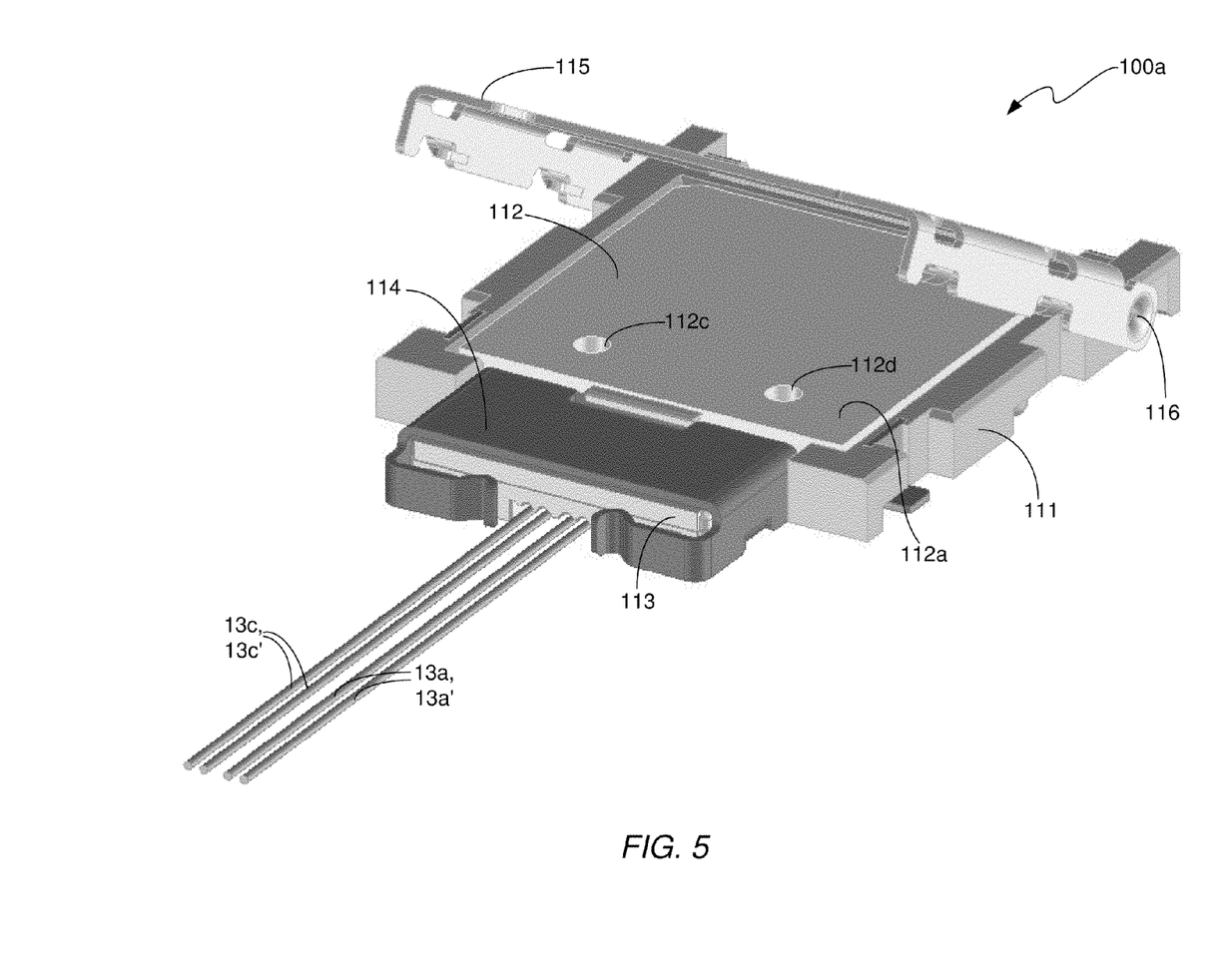
FIG. 5 illustrates a top perspective view of one of the CIO optical transceiver modules shown in FIG. 2.
Figure 6:
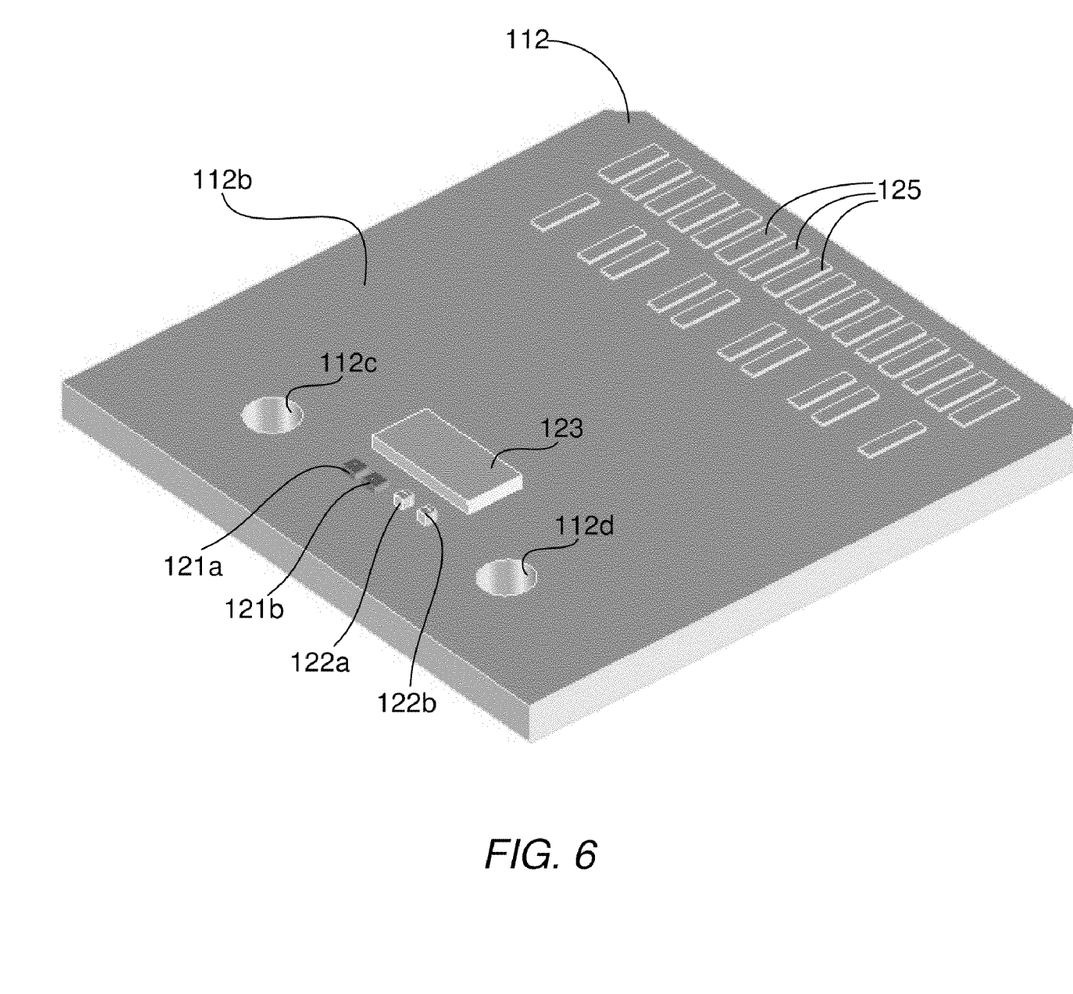
FIG. 6 illustrates a bottom perspective view of the PCB of the CIO optical transceiver module shown in FIG. 5 having laser diodes, photodiodes and an IC mounted thereon.
Figure 7:
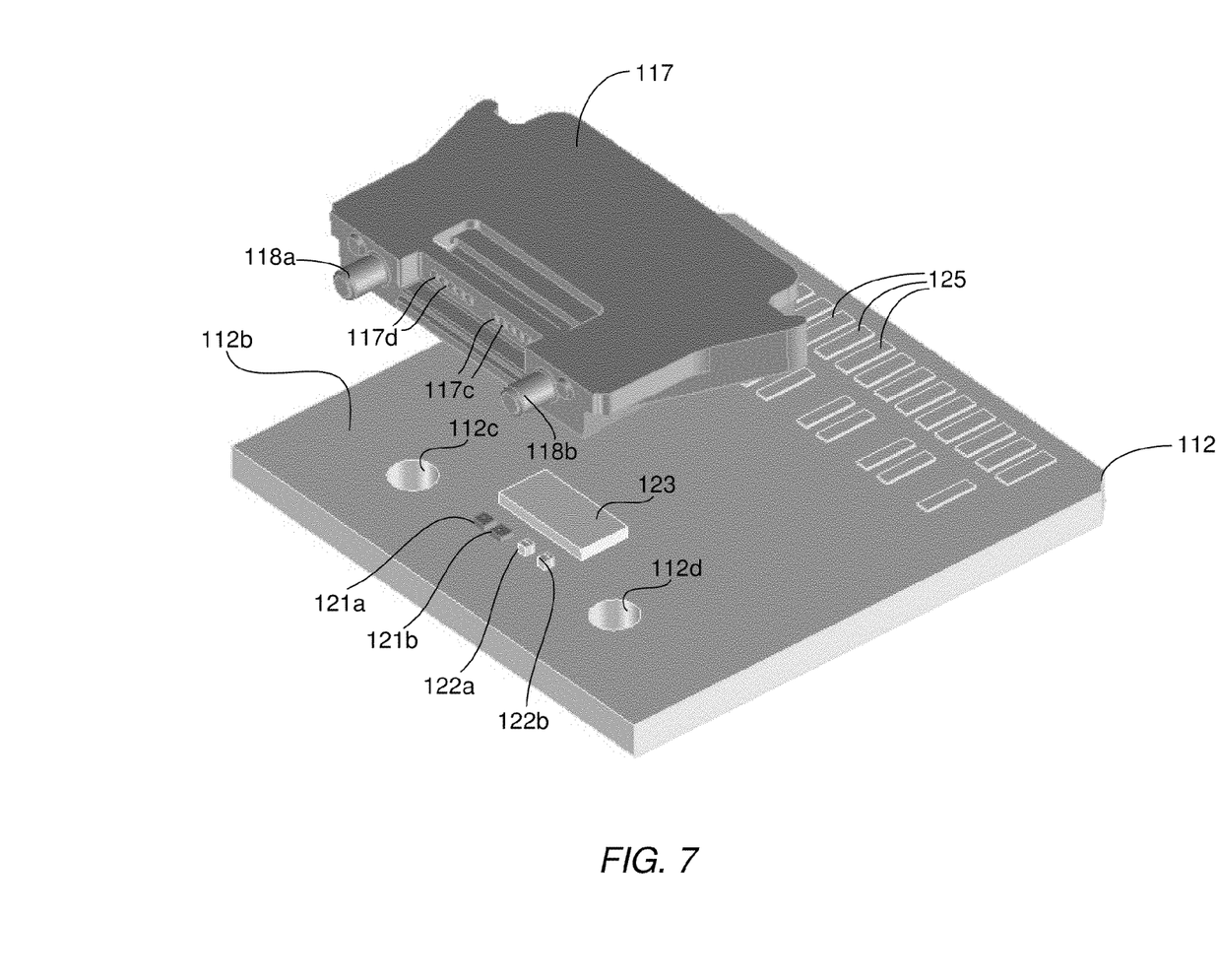
FIG. 7 illustrates a bottom perspective view of the PCB of the CIO optical transceiver module shown in FIG. 6 just prior to an optics system module being mounted on the PCB.
Figure 8:
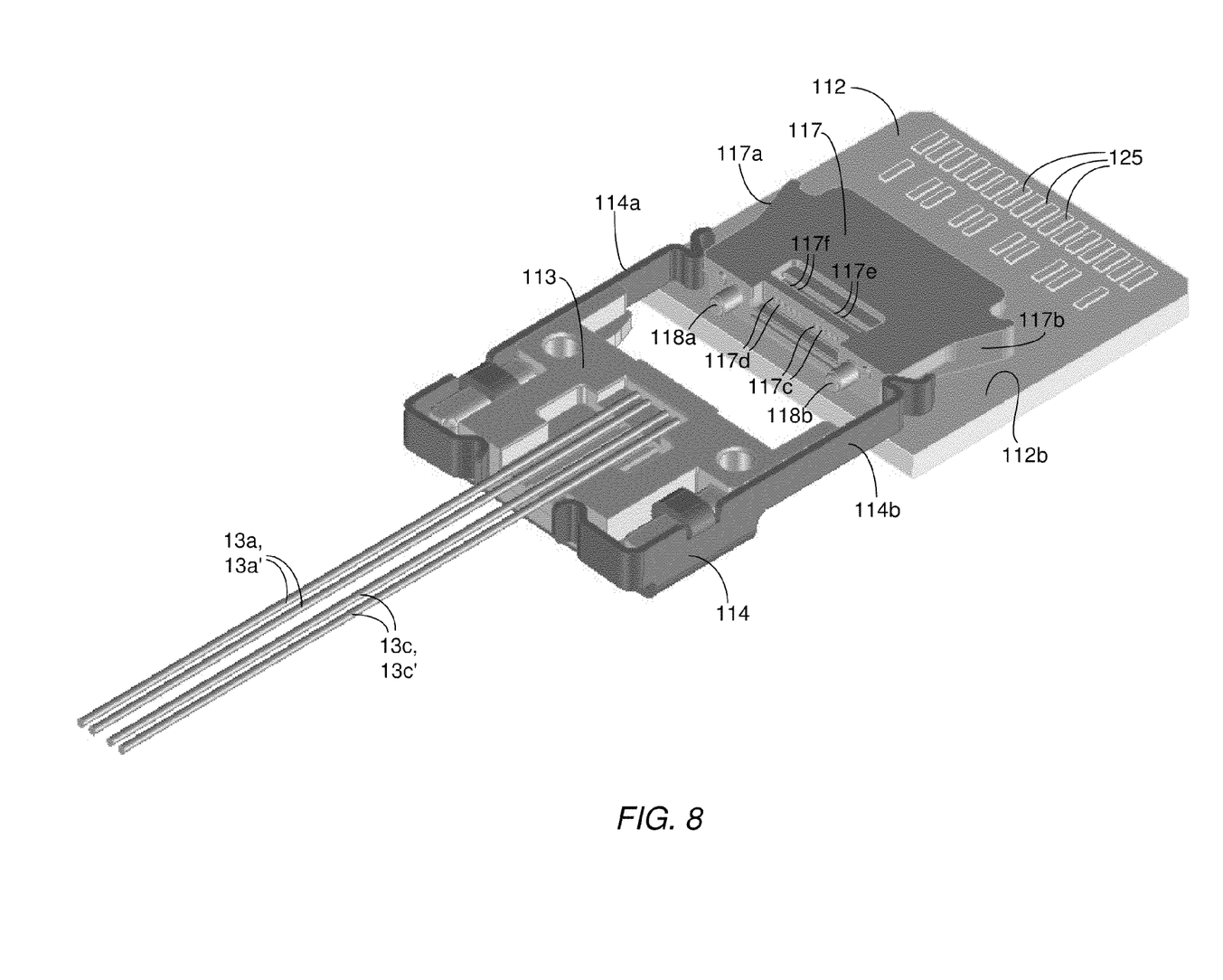
FIG. 8 illustrates a bottom perspective view of the PCB shown in FIG. 7 after the optics system module has been mounted on the PCB and just prior to the latch being secured to the optics system module.
Figure 9:
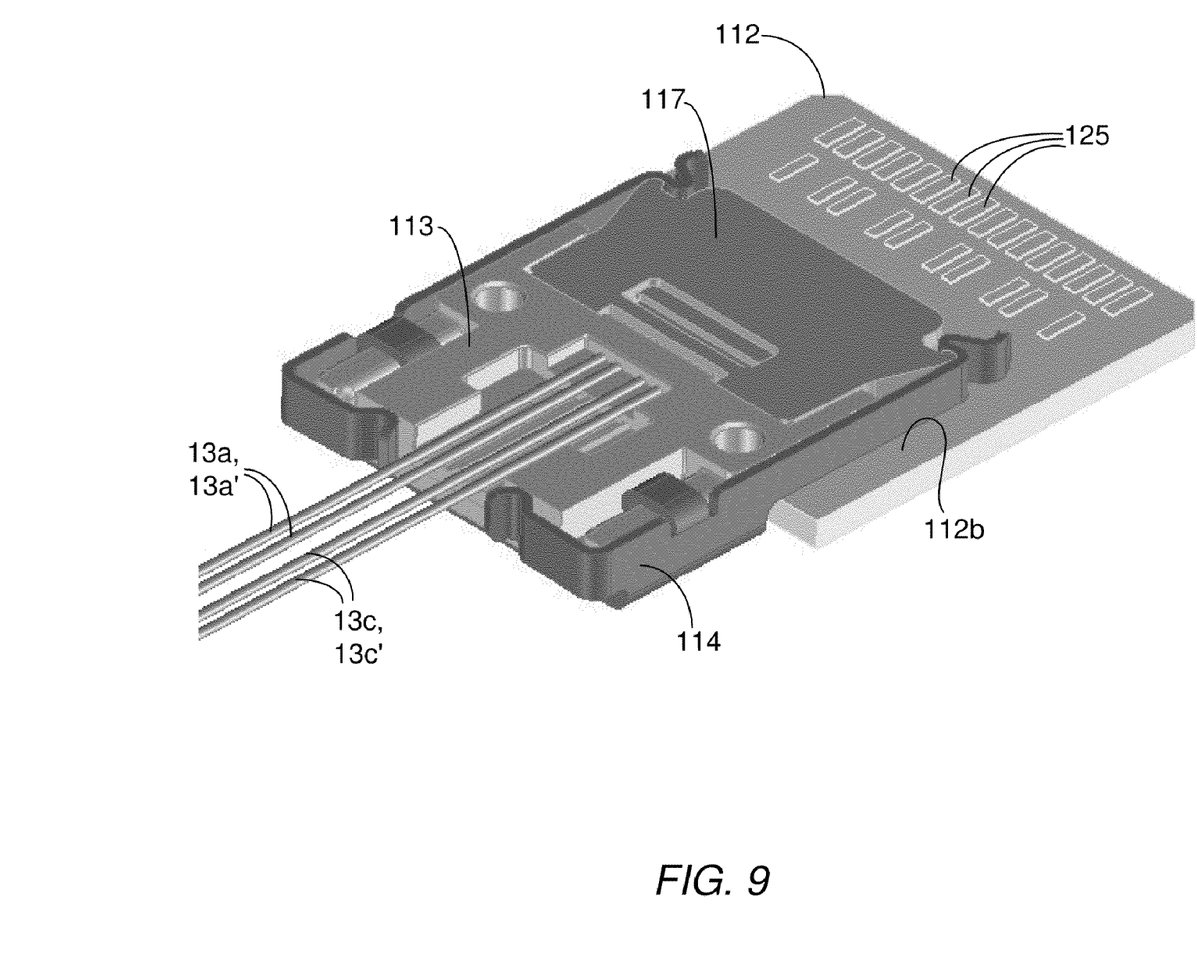
FIG. 9 illustrates a bottom perspective view of the PCB shown in FIG. 8 after the latch has been secured to the optics system module.

The components and assembly of the first CIO optical transceiver module 100a will now be described with reference to FIGS. 5-9. FIG. 5 illustrates a top perspective view of the first CIO optical transceiver module 100a. A socket 111 of the module 100a receives a PCB 112 of the module 100a. The socket 111 is mechanically and electrically coupled to the plug PCB 101. A jumper 113 of the module 100a holds the proximal ends of the transmit and receive optical fibers 13a-13d'. A latch 114 of the module 100a holds the jumper 113. A socket cover 115 is rotationally coupled to the socket 111 via coupling features 116 to allow the cover 115 to be placed in an opened position (shown in FIG. 5) and in a closed position (not shown for purposes of clarity). FIG. 6 illustrates a bottom perspective view of the PCB 112 shown in FIG. 5 after first and second laser diodes 121a and 121b, first and second photodiodes 122a and 122b, and an IC 123 have been mounted on the PCB 112. FIG. 7 illustrates a bottom perspective view of the PCB 112 shown in FIG. 6 just prior to an optics system module 117 being mounted on the PCB 112. FIG. 8 illustrates a bottom perspective view of the PCB 112 shown in FIG. 7 after the optics system module 117 has been mounted on the PCB 112 just prior to the latch 114 being secured to the optics system module 117. FIG. 9 illustrates a bottom perspective view of the PCB 112 shown in FIG. 8 after the latch 114 has been secured to the optics system module 117.

The first and second laser diodes 121a and 121b, respectively, and the first and second photodiodes 122a and 122b, respectively, are mounted on a lower surface 112b of the module PCB 112. The laser diodes 121a and 121b may be, but need not be, VCSELs. The photodiodes may be, but need not be, p-type-intrinsic-n-type (P-I-N) diodes. As indicated above, in contrast to the optical transceiver module of the active optical cable 2 shown in FIG. 1, which utilizes the aforementioned parallel arrays of laser diodes and parallel arrays of photodiodes, the CIO optical transceiver module 100a includes two singlet laser diodes 121a, 121b and two singlet photodiodes 122a, 122b for providing two transmit channels and two receive channels, respectively. Because the singlet laser diodes and photodiodes of the CIO optical transceiver module are utilized in many areas in the optical communications industry, they are typically manufactured in relatively large volumes, and thus are less expensive than the parallel arrays of laser diodes and parallel arrays of photodiodes that are used in the active optical cable 2 shown in FIG. 1. This feature helps lower the cost of the active optical cable 10 so that it is better suited for consumer applications than the active optical cable 2 shown in FIG. 1. It should be noted, however, that the invention is not limited to using only singlet laser diodes and photodiodes in the CIO optical transceiver modules 100a, 100b, or with respect to the number of laser diodes and photodiodes that are used in the modules 100a, 100b.

The IC 123 is also mounted on the lower surface 112b of the module PCB 112. The IC 123 includes laser diode driver circuitry and receiver circuitry (not shown for purposes of clarity) for performing a combination of laser diode driver functions and receiver functions. It should be noted that two or more ICs may be used to perform these functions instead of integrating all of this functionality into the single IC 123. The module PCB 112 has openings 112c and 112d formed therein for mating with respective protrusions (not shown for purposes of clarity) formed on the optics system module 117 to allow the optics system module 117 to be secured to the lower surface 112b of the module PCB 112. The module PCB 112 has a plurality of electrical contacts 125 thereon for electrically coupling the module PCB 112 to electrical contacts (not shown for purposes of clarity) of the plug PCB 101 (FIG. 4).

The optics system module 117 has protrusions 118a and 118b thereon that mate with respective openings (not shown for purposes of clarity) formed in the jumper 113 to optically align the optics system module 117 with the jumper 113. The sides 114a and 114b of the latch 114 are configured as spring elements that have shapes that are complementary to the shapes of the sides 117a and 117b, respectively, of the optics system module 117 to allow the latch 114 to snap fit onto the optics system module 117. When the latch 114 is secured to the optics system module 117 in this manner, the protrusions 118a and 118b are mated with the respective openings formed in the jumper 113 to optically align the jumper 113 with the optics system module 117.

The optics system module 117 has lenses 117c and 117d formed therein. The lenses 117c optically couple light between the proximal ends of the two transmit optical fibers 13a and 13a' and the respective laser diodes 121a and 121b. The lenses 117d optically couple light between the proximal ends of the two receive optical fibers 13c and 13c' and the respective photodiodes 122a and 122b. The optics system module 117 has 45° mirrors 117e and 117f therein that optically couple light between the lenses 117c and the photodiodes 122a, 122b and between the lenses 117d and the laser diodes 121a, 121b. In the embodiment shown in FIG. 8, more than four lenses 117c and 117d are shown in the optics system module 117. The additional lenses are not necessary, but allow for the possibility of accommodating configurations of the CIO optical transceiver module 100a that have more than two transmit and two receive channels.

In can be seen from the above description of the illustrative embodiment depicted in FIGS. 2-9 that active optical cable 10 of the invention has several advantages over the known active optical cable 2 shown in FIG. 1. Modification of the plug housing 5 in the manner described above to create plug housing 30 allows one or more of the CIO optical transceiver modules to be disposed within the plug housing 30. Eliminating the use of parallel arrays of VCSELs and parallel arrays of photodiodes in the optical transceiver module reduces the overall costs of the active optical cable 10, and yet the active optical cable 10 is capable of operating at high data rates. Reducing the number of piece parts that make up the delatch device 40 also reduces the overall cost of the active optical cable 10. In addition, the plug housing 30 implements a highly effective EMI shielding solution. Furthermore, the active optical cable 10, in accordance with the illustrative embodiment, is designed to ensure that it meets one or more applicable SFF standards. Also, because the same CIO optical transceiver module 100a, 100b can be used with different form factors (e.g., SFP, QSFP, CFP, CXP, etc.), a volume cost savings can be achieved, which further reduces the overall cost of the active optical cable 10. The combination of these features results in the active optical cable 10 being well suited for consumer applications. It should be noted, however, that while the active optical cable 10 is well suited for consumer applications, it is not limited to use in consumer applications, as will be understood by persons of ordinary skill in the art.

Figure 10:
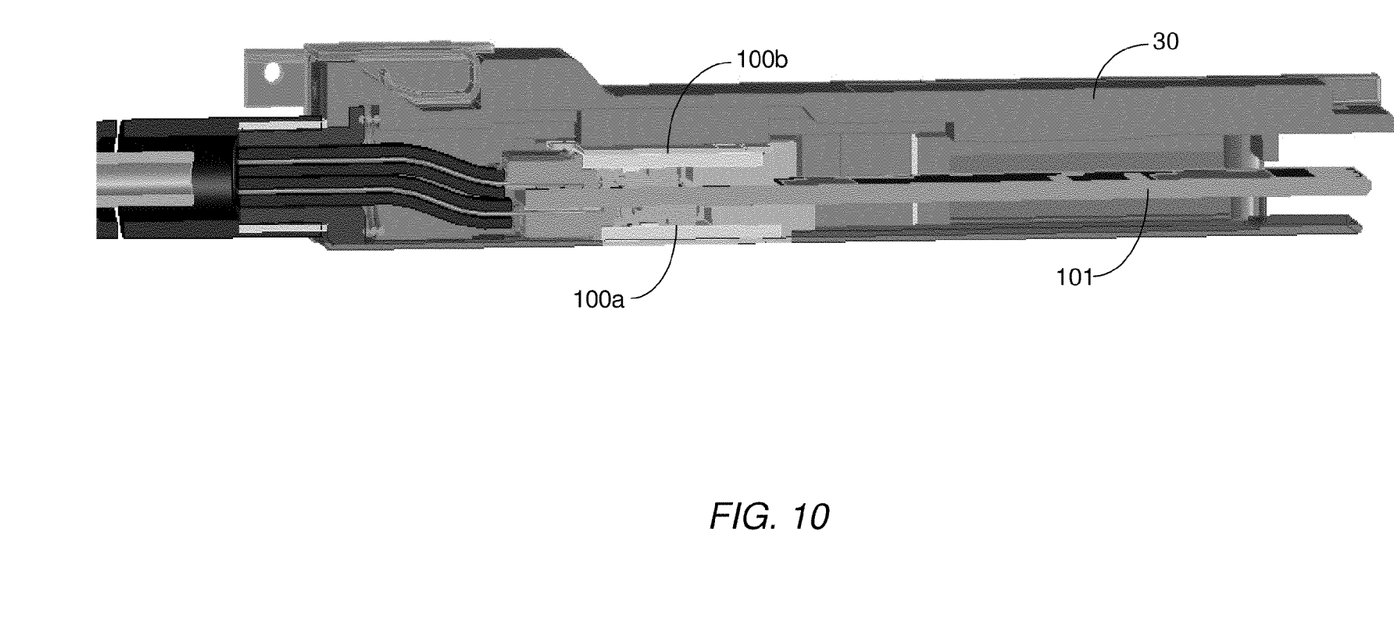
FIG. 10 illustrates a side cross-sectional view of the plug shown in FIG. 3 in accordance with an alternative embodiment in which the CIO optical transceiver modules are arranged vertically within the plug and mounted on opposite sides of the plug PCB.

FIG. 10 illustrates a cross-sectional side view of the plug housing 30 shown in FIG. 4 in accordance with an alternative embodiment in which the CIO optical transceiver modules 100a and 100b are arranged vertically within the plug housing 30 and are mounted on opposite sides of the plug PCB 101. This embodiment is an alternative to the arrangement shown in FIG. 4 in which the CIO optical transceiver modules 100a and 100b are mounted on the same side of the plug PCB 101, but are horizontally separated from each other. The arrangements shown in FIGS. 4 and 10 operate in the same manner, but differ in regard to the manner in which they occupy space within the plug housing 30. For example, the arrangement depicted in FIG. 4 allows the thickness of the plug housing 30 relative to the arrangement depicted in FIG. 10 to be decreased, but requires an increase in the length of the plug housing 30 compared to the arrangement depicted in FIG. 10. In contrast, the arrangement depicted in FIG. 10 requires an increase in the thickness of the plug housing 30 relative to the arrangement depicted in FIG. 4, but allows the length of the plug housing 30 to be decreased compared to the arrangement depicted in FIG. 4.

Figure 11:
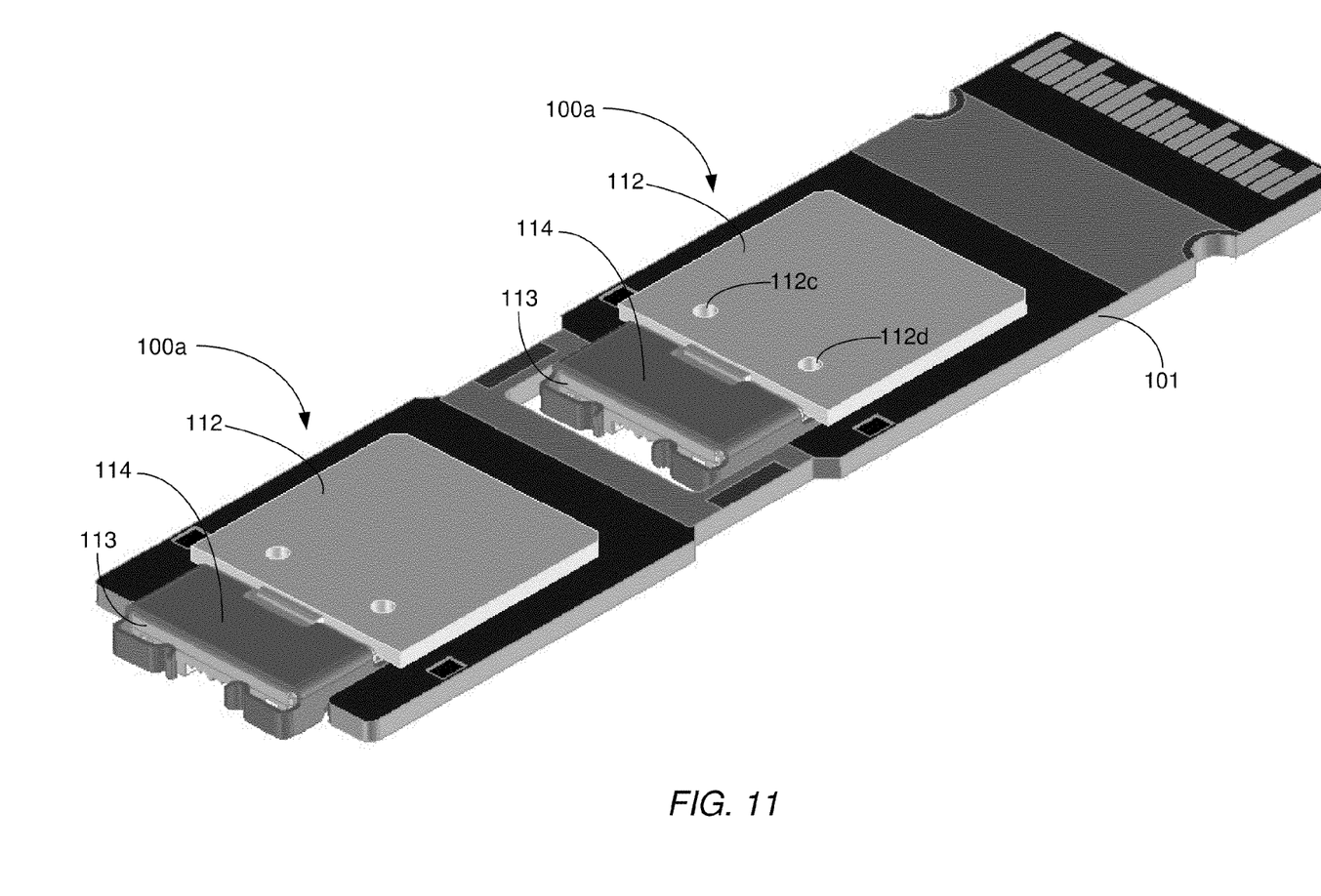
FIG. 11 illustrates a top perspective view of the plug PCB shown in FIG. 4 having two CIO optical transceiver modules of the type illustrated in FIGS. 5-9 mounted thereon, but with the sockets eliminated such that the PCBs of the CIO optical transceiver modules are mounted directly on the plug PCB.

FIG. 11 illustrates a top perspective view of the plug PCB 101 shown in FIG. 4 having two of the CIO optical transceiver modules 100a and 100b of the type shown in FIGS. 5-9 mounted thereon, except that the socket 111 shown in FIG. 5 has been eliminated from the CIO optical transceiver modules 100a and 100b. In accordance with this embodiment, the module PCBs 112 are directly attached to the plug PCB 101 using known surface mounting technology (SMT). Thus, the need for the sockets 111 is obviated. At the locations at which the module PCBs 112 are mounted on the plug PBC 101, portions of the plug PCB 101 have been removed to prevent the jumpers 113 from interfering with electrical circuitry of the plug PCB 101. Eliminating the sockets 111 reduces the total number of piece parts of the CIO optical transceiver modules 100a and 100b, thereby reducing overall costs, but reduces the total amount of surface area that is available on the plug PCB 101 for mounting other components. Thus, there are advantages and disadvantages to eliminating the socket 111 that should be taken into account when determining which of these configurations will be used.

It should be noted that the invention has been described with reference to illustrative embodiments and that the invention is not limited to these embodiments. Those skilled in the art will understand the manner in which modifications can be made to the illustrative embodiments and that all such modifications are within the scope of the invention. For example, although the plug housing 30 and the CIO optical transceiver modules 100a, 100b have been described as having particular configurations, persons skilled in the art will understand the manner in which these configurations may be modified while still achieving the goals of the invention. These and other modifications may be made to the embodiments described herein and all such modified embodiments are also within the scope of the invention, as will be understood by persons skilled in the art.

What is claimed is:

1. A consumer input/output (CIO) optical transceiver module for use in an active optical cable, the CIO optical transceiver module comprising:
    a module circuit board having a substrate, a plurality of electrical contacts disposed on the substrate and a plurality of electrical conductors passing through the substrate;
    at least first and second singlet laser diodes mounted on the circuit board substrate;
    at least first and second singlet photodiodes mounted on the circuit board substrate;
    at least one integrated circuit (IC) mounted on the substrate;
    an optics system module mounted on the substrate;
    a latch mechanically coupled to the optics system module; and
    a jumper mechanically coupled to the latch, the jumper holding proximal ends of at least first and second transmit optical fibers and first and second receive optical fibers, wherein a first set of optical elements of the optics system module optically couples light between the proximal ends of the first and second transmit optical fibers and the first and second singlet laser diodes, respectively, and wherein a second set of optical elements of the optics system module optically couples light between the proximal ends of the first and second receive optical fibers and the first and second singlet photodiodes, respectively.

2. The CIO optical transceiver module of claim 1, further comprising:
    a socket having the module circuit board secured therein, the socket being configured to mechanically and electrically couple with a plug housing of an active optical cable.

3. The CIO optical transceiver module of claim 2, wherein the latch and the optics system module have respective interlocking features thereon that interlock with each other to mechanically couple the latch with the optics system module, and wherein the mechanical coupling of the latch with the optics system module optically aligns the first and second sets of optical elements with the respective proximal ends of the respective transmit and receive optical fibers.

4. The CIO optical transceiver module of claim 1, wherein the CIO optical transceiver module causes optical signals to be transmitted over each of the transmit optical fibers at a rate of at least 10 gigabits per second (Gbps), and wherein the CIO optical transceiver module receives optical signals propagating out of the respective proximal ends of the respective receive optical fibers at a rate of at least 10 Gbps.

5. The CIO optical transceiver module of claim 1, wherein the optical elements of the first and second sets of optical elements include forty-five degree minors.

6. An active optical cable comprising:
    an optical fiber cable having at least first and second transmit optical fibers and at least first and second receive optical fibers surrounded by a cable jacket;
    a plug housing;
    a system circuit board mounted in the plug housing, the system circuit board having a first substrate, a plurality of electrical contacts disposed on the first substrate and a plurality of electrical conductors passing through the first substrate; and
    a first consumer input/output (CIO) optical transceiver module mounted within the plug housing comprising:
        a first module circuit board having a second substrate, a plurality of electrical contacts disposed on the second substrate and a plurality of electrical conductors passing through the second substrate, the system circuit board being electrically connected with the first module circuit board to allow the system circuit board and the first module circuit board to communicate with each other;
        at least first and second singlet laser diodes mounted on the second substrate;
        at least first and second singlet photodiodes mounted on the second substrate;
        at least a first integrated circuit (IC) mounted on the second substrate;
        a first optics system module mechanically coupled to the second substrate;
        a first latch mechanically coupled to the optics system module; and
        a first jumper mechanically coupled to the first latch, the first jumper holding proximal ends of at least the first and second transmit optical fibers and the first and second receive optical fibers, wherein a first set of optical elements of the first optics system module optically couples light between the proximal ends of the first and second transmit optical fibers and the first and second singlet laser diodes, respectively, and wherein a second set of optical elements of the optics system module optically couples light between the proximal ends of the first and second receive optical fibers and the first and second singlet photodiodes, respectively.

7. The active optical cable of claim 6, further comprising:
    a first socket having the first module circuit board secured therein, the socket being mechanically and electrically coupled with the plug housing.

8. The active optical cable of claim 7, wherein the first latch and the first optics system module have respective interlocking features thereon that interlock with each other to mechanically couple the first latch with the first optics system module, and wherein the mechanical coupling of the first latch with the first optics system module optically aligns the first and second sets of optical elements with the respective proximal ends of the respective first and second transmit and receive optical fibers.

9. The active optical cable of claim 6, wherein the first CIO optical transceiver module causes optical signals to be transmitted over each of the transmit optical fibers at a rate of at least 2.5 gigabits per second (Gbps), and wherein the first CIO optical transceiver module receives optical signals propagating out of the respective proximal ends of the respective receive optical fibers at a rate of at least 2.5 Gbps.

10. The active optical cable of claim 6, wherein the optical elements of the first and second sets of optical elements include forty-five degree mirrors.

11. The active optical cable of claim 7, further comprising:
    third and fourth transmit optical fibers and third and fourth receive optical fibers surrounded by said cable jacket;
    a second CIO optical transceiver module mounted within the plug housing, the second CIO optical transceiver module comprising:
        a second module circuit board having a third substrate, a plurality of electrical contacts disposed on the third substrate and a plurality of electrical conductors passing through the third substrate, the system circuit board being electrically connected with the second module circuit board to allow the system circuit board and the second module circuit board to communicate with each other;

at least third and fourth singlet laser diodes mounted on the third substrate;

at least third and fourth singlet photodiodes mounted on the third substrate;

at a second IC mounted on the third substrate;

a second optics system module mechanically coupled to the third substrate;

a second latch mechanically coupled to the second optics system module; and a second jumper mechanically coupled to the second latch, the second jumper holding proximal ends of at least the third and fourth transmit optical fibers and the third and fourth receive optical fibers, wherein a third set of optical elements of the second optics system module optically couples light between the proximal ends of the third and fourth transmit optical fibers and the third and fourth singlet laser diodes, respectively, and wherein a fourth set of optical elements of the second optics system module optically couples light between the proximal ends of the third and fourth receive optical fibers and the third and fourth singlet photodiodes, respectively.

12. The active optical cable of claim 11, further comprising:

a second socket having the second module circuit board secured therein, the second socket mechanically and electrically coupled with the plug housing.

13. The active optical cable of claim 12, wherein the second latch and the second optics system module have respective interlocking features thereon that interlock with each other to mechanically couple the second latch with the second optics system module, and wherein the mechanical coupling of the second latch with the second optics system module optically aligns the third and fourth sets of optical elements with the respective proximal ends of the respective third and fourth transmit and receive optical fibers.

14. The active optical cable of claim 11, wherein the first CIO optical transceiver module causes optical signals to be transmitted over each of the third and fourth transmit optical fibers at a rate of at least 2.5 gigabits per second (Gbps), and wherein the first CIO optical transceiver module receives optical signals propagating out of the respective proximal ends of the respective third and fourth receive optical fibers at a rate of at least 2.5 Gbps.

15. The active optical cable of claim 11, wherein the optical elements of the third and fourth sets of optical elements include forty-five degree mirrors.

16. A method for using a consumer input/output (CIO) optical transceiver module in an active optical cable, the method comprising:

providing a CIO optical transceiver module comprising:
a module circuit board having a substrate, a plurality of electrical contacts disposed on the substrate and a plurality of electrical conductors passing through the substrate;
at least first and second singlet laser diodes mounted on the circuit board substrate;
at least first and second singlet photodiodes mounted on the circuit board substrate;
at least one integrated circuit (IC) mounted on the substrate;
an optics system module mounted on the substrate;
a latch mechanically coupled to the optics system module; and
a jumper mechanically coupled to the latch;

connecting proximal ends of at least first and second transmit optical fibers and first and second receive optical fibers to the jumper;

with a first set of optical elements of the optics system module, optically coupling light between the proximal ends of the first and second transmit optical fibers and the first and second singlet laser diodes, respectively; and with a second set of optical elements of the optics system module, optically coupling light between the proximal ends of the first and second receive optical fibers and the first and second singlet photodiodes, respectively.

17. The method of claim 16, wherein the CIO optical transceiver module further comprises:

a socket having the module circuit board secured therein, the socket being configured to mechanically and electrically couple with a plug housing of an active optical cable.

18. The method of claim 17, wherein the latch and the optics system module have respective interlocking features thereon that interlock with each other to mechanically couple the latch with the optics system module, and wherein the mechanical coupling of the latch with the optics system module optically aligns the first and second sets of optical elements with the respective proximal ends of the respective transmit and receive optical fibers.

19. The method of claim 16, wherein the CIO optical transceiver module causes optical signals to be transmitted over each of the transmit optical fibers at a rate of at least 2.5 gigabits per second (Gbps), and wherein the CIO optical transceiver module receives optical signals propagating out of the respective proximal ends of the respective receive optical fibers at a rate of at least 2.5 Gbps.

* * * * *